United States Patent [19]

Lysén

[11] Patent Number: 4,804,912

[45] Date of Patent: Feb. 14, 1989

[54] APPARATUS FOR ELECTROMAGNETICALLY MEASURING THE DISTANCE BETWEEN TWO OPPOSING GRINDING SURFACES

[75] Inventor: Claes G. Lysén, Karlstad, Sweden

[73] Assignee: Kamyr AB, Karlstad, Sweden

[21] Appl. No.: 49,549

[22] Filed: May 14, 1987

[51] Int. Cl.⁴ ............................................. G01B 7/14
[52] U.S. Cl. .................................... 324/207; 324/239
[58] Field of Search ............... 324/207, 208, 233, 234, 324/236, 237, 239, 240, 260, 262

[56] References Cited

U.S. PATENT DOCUMENTS

| | | | |
|---|---|---|---|
| 2,531,414 | 11/1950 | Engvall. | |
| 3,441,840 | 4/1969 | Randle. | |
| 3,922,599 | 11/1975 | Steingroever et al. | 324/232 X |
| 4,387,339 | 6/1983 | Akerblom | 324/207 |
| 4,509,295 | 4/1985 | Böttcher et al. | 324/226 X |
| 4,567,435 | 1/1986 | Yamada et al. | 324/207 |
| 4,618,825 | 10/1986 | Fischer | 324/262 X |
| 4,652,820 | 3/1987 | Maresca | 324/232 X |
| 4,661,774 | 4/1987 | Montgomery | 324/231 |
| 4,694,247 | 9/1987 | Meili et al. | 324/226 X |

Primary Examiner—Reinhard J. Eisenzopf
Assistant Examiner—Warren S. Edmonds
Attorney, Agent, or Firm—Nixon & Vanderhye

[57] ABSTRACT

A transucer is encapsulated within a stainless steel housing in a recess opening within one of the grinding surfaces of a pair of opposed grinding surfaces between which material to be ground (e.g., wood chips to produce mechanical paper pulp) is disposed. Pole pieces formed of a material having wear properties corresponding to the wear properties of the grinding surfaces project through the cover of the housing to terminate flush with one of the grinding surfaces. Consequently, energization of the primary winding establishes a magnetic field through the core, pole pieces, across the gap and into the opposed grinding member, the strength of which is proportional to the distance betwen the pole pieces and the opposed grinding surface. The induced voltage from the secondary coil serves as a measure of the gap distance.

13 Claims, 2 Drawing Sheets

U.S. Patent  Feb. 14, 1989  Sheet 1 of 2  4,804,912
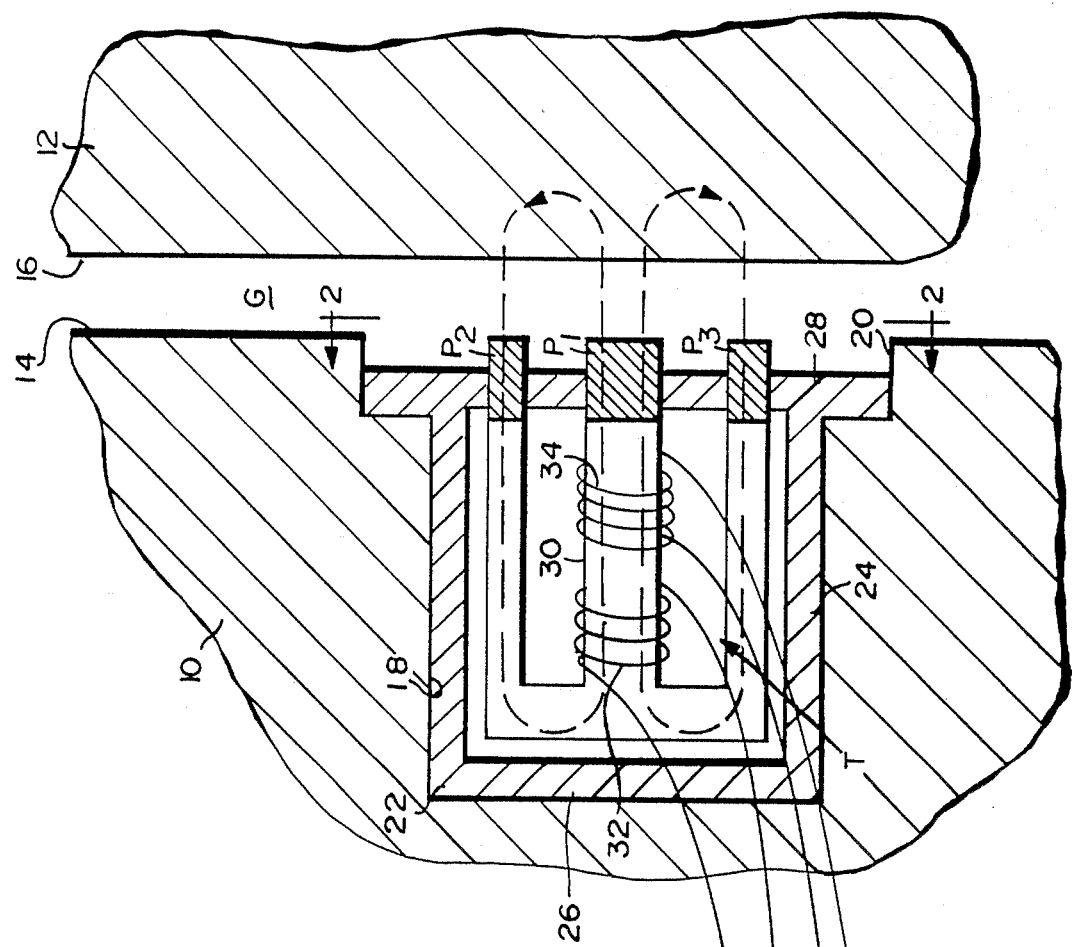
FIG. I
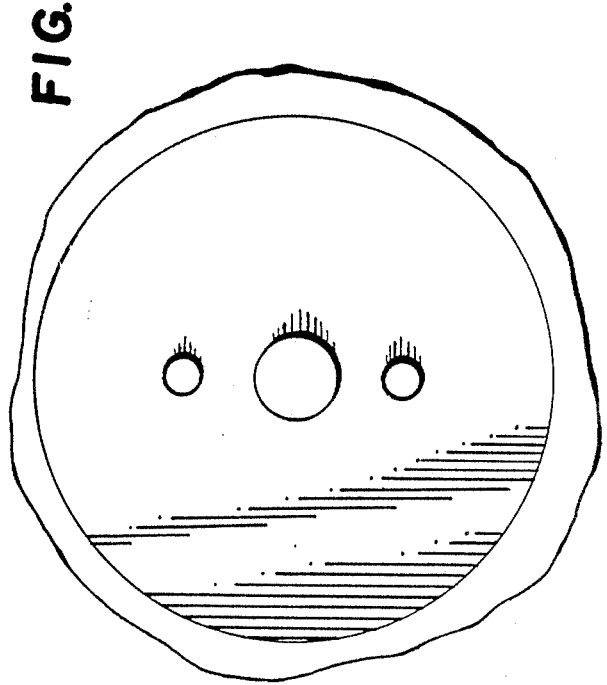
FIG. 2

APPARATUS FOR ELECTROMAGNETICALLY MEASURING THE DISTANCE BETWEEN TWO OPPOSING GRINDING SURFACES

BACKGROUND AND SUMMARY OF THE INVENTION

The invention relates to a method and apparatus for measuring the spacing between a pair of surfaces, at least one of which is formed of ferromagnetic material. The invention contemplates utilization of magnetic fields for making distance determinations, and is particularly adaptable for situations where one surface wears with respect to another during use.

The primary applicability of the invention is to machinery in which it is important that a particular clearance be maintained between two metallic surfaces that are moving relative to each other. For instance, in conical plug valves or feeders which are used in the cellulose pulp industry (for example, in connection with rotating pocket feeders for high and/or low pressure system in the continuous digestion of wood chips to cellulosic pulp, such as those sold by Kamyr A.B. of Karlstad, Sweden, or Kamyr, Inc. of Glens Falls, New York), a pocketed rotating plug is generally conical in shape and fits into a corresponding conical-shaped opening in the stationary housing. Such feeders are exposed to pressures in the range of about 1-15 bars, and it is necessary that the clearance between the rotor and the housing be kept at a minimum in order to avoid excessive leakage of cooking liquor, while at the same time being large enough so that metallic contact between the relatively moving rotor and housing does not occur. By practicing the present invention and by utilizing a control system, the rotor plug of such a feeder can be automatically adjusted in the axial direction in order to obtain the desired results, and significant monetary and technical advantages.

The invention is also applicable to other industries, for instance, where there is a need for measuring the clearance in plain bearings, and to other aspects of the pulp industry, as when measuring the gap in various grinding machines, and the like. For instance, in the pulp and paper industry, refiners (also known as defibrators) are used to grind raw cellulosic material, such as chips, into pulp, normally utilizing a stationary grinding surface and a rotating grinding surface, which surfaces may be either of conical or flat configuration. The raw material to be ground passes between the opposing surfaces. In such refiners, it is necessary that the gap between the grinding surfaces be kept at a desired distance (which can be as little as a fraction of a millimeter), and it is also necessary that this clearance be accurately measured and adjusted during operation, taking into account any wear of the grinding surfaces. The surfaces are, in most cases, rough, having grinding portions disposed in a pattern, and of course the spacing between the surfaces must be controlled so that the grinding portions do not touch each other. It is desirable to provide for automatic control of the grinding surfaces so that a desired optimum gap is kept between them.

There have been a number of previous proposals for utilizing magnetic reluctance between a transducer and a closely located ferromagnetic object for distance measurement, such as shown in U.S. Pat. No. 4,387,339. In such devices, when the magnetic field is produced by direct current, the accuracy of the measurement procedure is often disturbed by temperature variations (since they influence the permeability of the ferromagnetic material). Other prior art procedures are based on the utilization of a transducer which generates an alternating current magnetic field which induces eddy currents in an electrically conducting object. The eddy current varies with the distance to the transducer. These measurement techniques are also not necessarily precise since they can be disturbed by variations in the resistivity of the object, and the medium between the object and the transducer.

Additional problems arise in using transducers in surroundings which are deleterious to their proper functioning. For example, magnetic windings, to function properly, must not be exposed to aggressive surroundings in the measuring gap, for example, to cellulose pulp disposed in the gap between opposed relatively rotating grinding surfaces. Exposure of the windings to water, chemicals, elevated temperatures and pressure pulsations would adversely affect the proper operation of the transducer. Additional practical constraints are imposed on the disposition of transducers in such environment. For example, a material surrounding the tranducer and protecting it must not short-circuit the magnetic field; and must be formed of materials which are mechanically strong and chemically resistant at the working temperatures and pressures of the device.

Moreover, problems arise in the use of cores desirably formed of high permeable magnetic material in conjunction with surfaces thereof necessarily exposed to the surrounding high pressure and temperature, chemically abrasive environment. While it is desirable to have transducer cores of high permeability materials, it is also necessary that such materials, when exposed to the environment, do not abrade or wear differently than the grinding surface. If this occurs, potentially false measurements of the gap due to wear may arise.

According to the present invention, apparatus and methods for measuring the distance between opposing relatively moving surfaces are provided which minimize or eliminate the above-identified drawbacks and disadvantages associated with prior measuring devices. In practicing the present invention, there is provided first and second surfaces with at least the second surface being formed of magnetic material, i.e., a ferromagnetic material. A single transducer is carried by the first surface and has a core surrounded by a first coil. The poles of the core terminate substantially flush with the first surface and are spaced from the second surface to define a gap therewith. Electrical currents supplied to the first coil establish a magnetic field through the core, poles, gap and the second surface, the strength of the field being a function of the distance between the surfaces. A second coil carried by the core produces an electrical signal proportional to the strength of the field. In this manner, the gap between the first and second surfaces can be continuously monitored.

The present invention minimizes or eliminates problems associated with the potential for short-circuiting the magnetic field established by the first coil, at the same time affording an environment for the transducer which is sufficiently strong and chemically resistant to negate the adverse effects of the working environment, i.e., high pressures and working temperatures, for example, on the order of 150°-180° C. in a refiner for grinding cellulose pulp. To accomplish this, the transducer is disposed in and encapsulated by a stainless steel housing, in turn, disposed in a recess formed in the first member carrying the first surface. The housing is formed of stainless steel to provide low electrical conductivity. Because the magnetic field is an alternating field, the stainless steel housing confines the magnetic field inside the housing except to the extent that the field extends through the poles, across the gap and into the magnetic material of the second member carrying the second surface.

In another aspect of the present invention and in order to ensure that the transducer accurately measures the gap distance between the relatively rotating surfaces as they are worn, the present invention provides poles which project from the stainless steel housing to terminate flush with the first surface. In accordance with the present invention, the core is formed in segments wherein the pole pieces are formed of the same material as the material forming the first surface or other magnetic material having a corresponding wear resistance. Thus, while the poles may be formed of a material highly resistant to wear similarly as the first surface, and as such, they are formed of a material of lower magnetic permeability, the poles are connected to the core over a very short distance. In this manner, the magnetic field passes through a material of relatively low permeability for only a very short distance. Thus, the magentic field does not deteriorate significantly in any manner which would deleteriously affect the measurement. As a result of this construction, the poles are worn at the same rate as the surrounding material of the first surface, thereby enabling the continuous and accurate monitoring of the gap.

In a further form of the invention, the second coil produces an electrical signal which is proportional to the strength of the field and, hence, monitors the gap distance. The gap distance can then be adjusted by mechanical means in accordance with the electrical signal. In a still further form of the present invention, an amplifier regulates the current supplied to the first coil such that an alternating current voltage with constant amplitude is obtained in the second coil whereby the value of the current supplied to the first coil is proportional to the strength of the field and, hence, the gap distance. Monitoring of the electric current supplied to the first coil thus provides a signal for driving mechanical means to adjust the gap as desired.

It is therefore a primary object of the present invention to provide novel and improved methods and apparatus for determining the gap distance between opposing surfaces using electromagnetic techniques. This and further objects and advantages of the present invention will become more apparent upon reference to the following specification, claims and drawings.

BRIEF DESCRIPTION OF THE DRAWINGS

FIG. 1 is a schematic representation of apparatus for measuring the distance between two opposing relatively moving surfaces constructed in accordance with the present invention;

FIG. 2 is an end view of one of grinding surfaces illustrating the pole pieces projecting through the transducer housing cover.

DETAILED DESCRIPTION OF THE DRAWING

Figure 3:
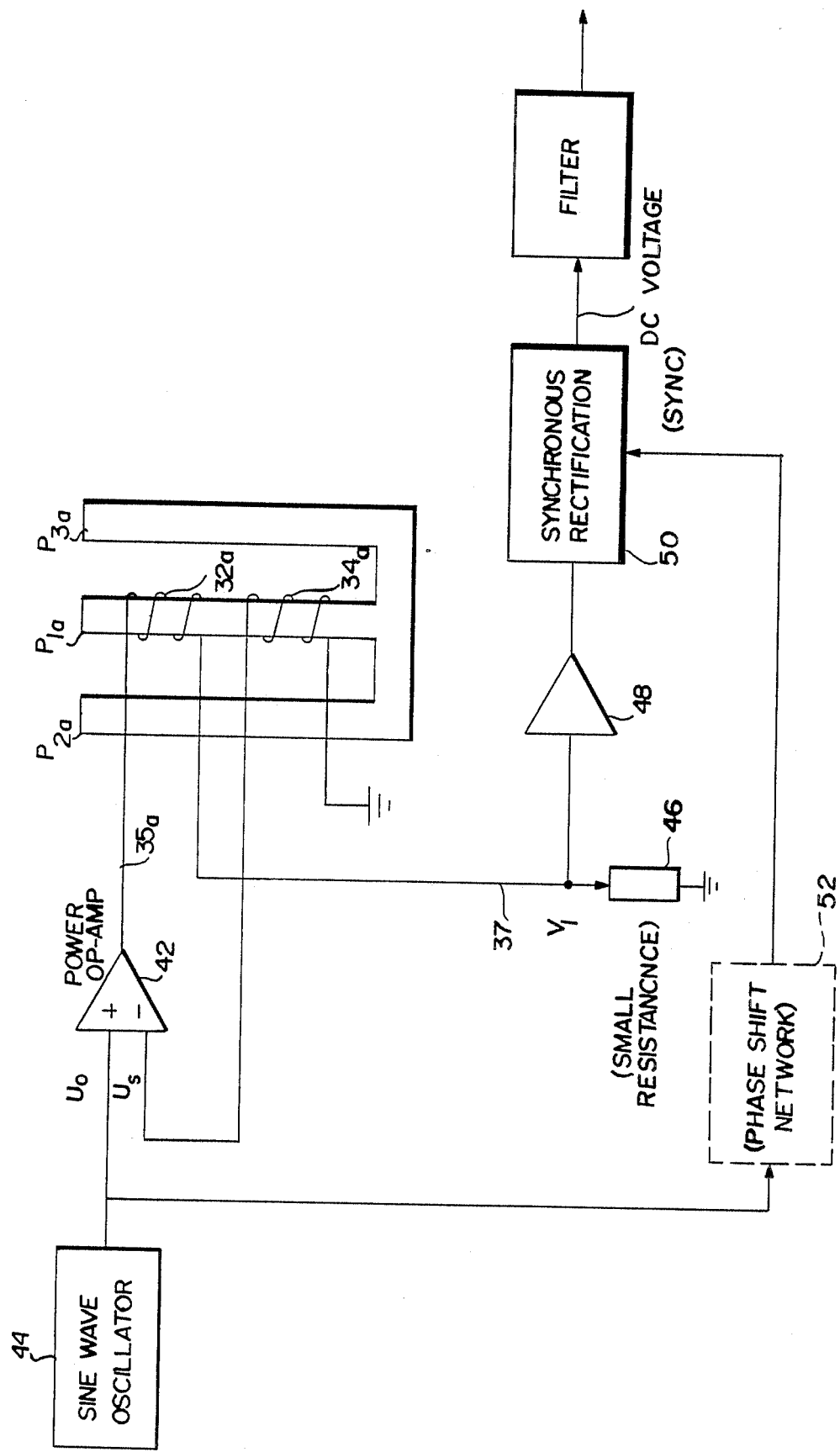
FIG. 3 is a schematic electrical diagram of a further electrical circuit according to a second embodiment hereof.

Referring now to the drawing figure, there is illustrated a pair of relatively moving members 10 and 12 having opposed surfaces 14 and 16, respectively, defining a gap G therebetween. For example, member 12 and grinding surface 16 may form part of a rotating rotor for use in a refiner for grinding pulp material between the opposed surfaces 14 and 16. The member 10 and the surface 14 may be stationary or rotatable. A recess 18 is formed in the member 10 and is counterbored at 20 to open through the grinding surface 14 in opposition to grinding surface 16. Disposed within the recess 18 is a housing 22 having side walls 24, a bottom 26 and a cover 28 for containing a transducer T. As illustrated, the cover 28 is set back from the surface 14 of member 10 for reasons which will become apparent from the ensuing description.

The gap between the surfaces 14 and 16 and between cover 28 and surface 16 may be filled with a medium, which in the cellulosic industry typically would be a slurry of comminuted cellulosic material, the material is subject to relatively high pressures and temperatures.

The transducer T is disposed within the housing 22 and includes a core 30 about which is coupled a first winding or coil 32. Current leads 35 are connected with coil 32 and to a source of alternating current of suitable frequency for energizing transducer T. A secondary winding or coil 34 is disposed about the core 30 and coupled through suitable leads 36 to an electronic unit 38. The electronic unit 38 may comprise a suitable source of alternating current for supplying current through lines 35 to transducer T as well as providing a suitable indicator responsive to the induced voltage from lines 36 to provide a signal proportional to the gap distance between surfaces 14 and 16, i.e., proportional to the wear of the surfaces.

It is an important aspect of the present invention that the transducer T be protected from the surrounding environment, particularly protected from the high pressures and temperatures of the material to be ground, as well as its mechanical and chemical abrasive characteristics. To these ends, a transducer T is entirely encapsulated within the housing 22 with the pole pieces P1, P2 and P3 projecting through the cover 28 toward the surface 16. Thus, the transducer T is isolated, with the exception of the pole pieces, from the materials disposed between the grinding surfaces 14 and 16.

This encapsulation of the transducer T is also highly advantageous from an electromagnetic standpoint. That is, it is important that the magnetic field created by the transducer T be directed along the core, through the pole pieces, across the gap and in the magnetic material of the opposing surface 16 and member 12 rather than being short-circuited through surrounding material. The housing is therefore formed of stainless steel, a material of low electric conductivity, i.e., less than $2 \times 10^6$ S/m (Siemens per meter), the housing essentially confines the magnetic field to within the housing and across the gap into the opposing surface. Thus, carbon steel and most other metals having magnetic properties, as well as plastic materials, would not generally be useful in forming the housing 22.

It is essential in accordance with the present invention that the pole pieces wear similarly as the surfaces 14 and 16 confining the material being ground. Any deviation of the wear of the poles differently from that of the surfaces 14 and 16 will result in an error in the desired distance measurement between the two surfaces 14 and 16. Accordingly, the pole pieces are preferably formed of the same material as the grinding surfaces 14 and 16 or formed of other magnetic material having a wear resistance corresponding to the wear resistance of the surfaces 14 and 16. In this manner, the wear of the pole pieces will be identical to the wear of the surfaces 14 and 16. To accomplish this, the core is segmented with the principal part of the core within the housing 22 formed of a high permeable magnetic material, i.e., a relative greater permeability greater than approximately 500. The parts susceptible to wear, the pole pieces, are bonded to the core and project through the cover 28. Thus, the body of the core is not subject to the high pressures and temperatures of the grinding material, while the pole pieces P1, P2 and P3 which project from cover 28 are subject to such environment. Because of the necessity to form the pole pieces of material having wear properties similar to those of surfaces 14 and 16, such material generally would have low magnetic permeability. However, the poles formed of the high wear resistant material extend only a short distance sufficient to project through the housing 28 such that their ends terminate flush with the surface 14. In this manner, the magnetic field extends for only a short distance through the pole pieces.

In use, alternating current is supplied through lines 35 to the primary coil 32 of transducer T to establish a magnetic field which includes the core, the pole pieces, the gap and the grinding surface and member 12. The strength of the magnetic field is a function of the distance between the pole piece and the surface 16. Consequently, the induced voltage in the secondary coil 34 detected at the electronic unit is proportional to the wear of the grinding surfaces. This induced voltage may be used as a signal for driving a mechanical transducer, for example for axially displacing the member 10 toward or away from the member 12 and, hence, grinding surface 16.

Alternatively, an amplifier may regulate the current supplied to the primary coil to obtain an alternating current voltage with constant amplitude in the secondary winding. Consequently, changes in the applied current constitute a measurement of the gap distance between surfaces 14 and 16. That change in current may similarly be used to drive a mechanical transducer to effect movement of member 10 toward and away from member 12 and, hence, grinding surface 16.

This latter alternative embodiment is more particularly disclosed in FIG. 3 wherein like reference numerals are applied to like parts followed by the suffix "a". In FIG. 3, there is illustrated a normal high gain operational amplifier 42 with enhanced output current capacity. The non-inverting input $U_o$ is connected to an oscillator 44 and the inverting input $U_s$ of amplifier 42 is connected to the secondary winding 34a. The primary current through line 34a will then automatically be adjusted so that $U_s=U_o$. Since $U_o$ is a sine wave with constant amplitude, $U_s$ will thus also be a sine wave with almost constant amplitude.

A voltage V1 proportional to the current in line 37 is developed across a resistor 46. This voltage is amplified in amplifier 48 and rectified using a phase sensitive detector 50 and 52 for optimum noise suppression. The rectified voltage is then further filtered at 54 and offset and amplitude adjusted to provide a distance signal.

In use, as the gap between the grinding surfaces narrows, the intensity of the magnetic field generated by the primary coil 32 increases. The secondary coil 34 responds by increasing the voltage at $U_s$. As the voltage at $U_s$ increases, the current in line 37 decreases to provide decreased output voltage V1. That voltage V1 is therefore a function of the gap distance and is used, after being rectified and filtered, to drive mechanical apparatus whereby the gap distance can be adjusted.

It will thus be appreciated that according to the present invention there is provided simple, effective and reliable apparatus and methods for determining the gap distance between relatively moving opposing surfaces using electromagnetic techniques. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent apparatus and methods.

What is claimed is:

1. Apparatus for measuring the distance between opposed first and second grinding surfaces carried by first and second members, respectively, the second surface being formed of a magnetic material, comprising:
   a transducer carried by the first member and having a core surrounded by a first coil, said core having poles terminating substantially flush with the first grinding surface and spaced from the second grinding surface to define a gap therebetween;
   means for supplying electrical current to said first coil to establish a magnetic field through the core, poles, gap and the second surface, the strength of which is a function of the distance between the surfaces; and
   a second coil carried by said core for producing an electrical signal proportional to the strength of the field, said poles and said core being formed of different materials with the poles being formed of magnetic material having substantially the same wear resistance as the material forming the first grinding surface. material forming the first surface.

2. Apparatus according to claim 1 wherein the first member has a recess opening through said first surface, a housing in said recess and surrounding said core, said housing being formed of a material having low electric conductivity.

3. Apparatus according to claim 1 wherein the material surrounding the poles is formed of a non-magnetic material.

4. Apparatus according to claim 2 wherein said housing is formed of stainless steel and includes a cover set back from the first surface leaving the poles to project from the cover toward the second surface to lie flush with the first surface.

5. Apparatus according to claim 4 wherein said poles and said core are formed of different materials with the poles being formed of the same material forming the first surface.

6. Apparatus according to claim 1 including an amplifier for regulating the current supplied to said first coil such that an alternating current voltage of substantially constant amplitude is obtained in the second coil whereby the current supplied to the first coil is proportional to the strength of the field.

7. In a grinding machine, apparatus for determining wear comprising:

opposed first and second members having respective first and second generally planar grinding surfaces rotatable relative to one another about a substantially common axis, said surfaces being spaced from and in opposition to one another for grinding material therebetween:

a transducer carried by said first member including a core surrounded by a first coil, said core having poles terminating in a plane common to the plane containing said first grinding surface and spaced from said second surface to define a gap therebetween;

means for supplying electrical energy to the first coil thereby establishing a magnetic field through the core, poles, gap and said second surface, the strength of which is proportional to the distance between said first and second surface; and a second coil about said first core for producing a signal proportional to the strength of the magnetic field, said poles and said core being formed of different materials, the poles being formed of like material as the material forming the grinding surface of said first member.

8. Apparatus according to claim 7 including means defining a recess in said first member opening through said first surface, a housing encapsulating said core and disposed in said recess, said poles projecting from said housing to lie in said common plane, said housing being formed of a low electrically conductive material.

9. Apparatus according to claim 8 wherein said housing is formed of a stainless steel material.

10. Apparatus according to claim 8 wherein said housing includes a cover set back from the first surface leaving the poles to project from the cover toward the second surface.

11. Apparatus according to claim 10 wherein said housing is formed of stainless steel, said poles and said core being formed of materials having different magnetic properties, the poles comprising pole pieces extending from the core within the housing and through the cover toward said second surface.

12. Apparatus according to claim 10 wherein said housing is formed of stainless steel, said poles and said core being formed of like material as the material forming the grinding surfaces of said first member, the poles comprising pole pieces extending from the core within the housing and through the cover toward said second surface.

13. Apparatus according to claim 7 including an amplifier for regulating the current supplied to said first coil such that an alternating current voltage of substantially constant amplitude is obtained in the second coil whereby the current supplied to the first coil is proportional to the strength of the field.

* * * * *

UNITED STATES PATENT AND TRADEMARK OFFICE
CERTIFICATE OF CORRECTION

PATENT NO. : 4,804,912
DATED : February 14, 1989
INVENTOR(S) : Claes G. LYSEN

It is certified that error appears in the above-identified patent and that said Letters Patent is hereby corrected as shown below:

Column 6, line 43, after the period, delete "material forming the first surface.".

Signed and Sealed this

Fifteenth Day of March, 1994

BRUCE LEHMAN

Attest:

Attesting Officer

Commissioner of Patents and Trademarks